United States Patent [19]

Morin et al.

[11] Patent Number: 4,836,650
[45] Date of Patent: Jun. 6, 1989

[54] PROCESS FOR THE PRODUCTION OF A DIODE ARRAY AND LIQUID CRYSTAL DISPLAY SCREEN

[76] Inventors: Francois Morin, Le Carpont, Lanmerin; Michel Le Contellec, 3, Haineau du chéne, both of 22300 Lannion, France

[21] Appl. No.: 934,613

[22] PCT Filed: Mar. 13, 1986

[86] PCT No.: PCT/FR86/00084
§ 371 Date: Nov. 7, 1986
§ 102(e) Date: Nov. 7, 1986

[87] PCT Pub. No.: WO86/05893
PCT Pub. Date: Oct. 9, 1986

[30] Foreign Application Priority Data

Mar. 26, 1985 [FR] France .................. 85 04480

[51] Int. Cl.[4] .................. G02F 1/13; H01L 21/205
[52] U.S. Cl. .................. 350/334; 350/333; 350/336; 350/339 R; 437/51; 437/101; 437/181
[58] Field of Search .............. 350/334, 333, 332, 336, 350/339 R; 357/30 E, 30 K, 57; 437/51, 101, 181

[56] References Cited

U.S. PATENT DOCUMENTS

| | | | |
|---|---|---|---|
| 4,237,150 | 12/1980 | Wiesmann | 437/101 X |
| 4,470,667 | 9/1984 | Okubo et al. | 350/334 |
| 4,545,111 | 10/1985 | Johnson | 350/334 |
| 4,643,527 | 2/1987 | Magarino et al. | 437/233 X |
| 4,666,252 | 5/1987 | Yamiv et al. | 350/333 |
| 4,704,784 | 11/1987 | Szydlo et al. | 437/101 X |
| 4,715,685 | 12/1988 | Yaniv et al. | 350/333 |
| 4,728,172 | 3/1988 | Cannella | 350/333 |

FOREIGN PATENT DOCUMENTS

| | | |
|---|---|---|
| 0103523 | 3/1984 | European Pat. Off. . |
| 0150728 | 8/1985 | European Pat. Off. . |
| 2385165 | 10/1978 | France . |
| 2518788 | 6/1983 | France . |
| 2551902 | 3/1985 | France . |
| 2091468 | 7/1982 | United Kingdom .............. 350/334 |

OTHER PUBLICATIONS

D. Ast., "Materials Limitations of Amorphous-Si:H Transistor", Proceedings of the SID, vol. 24, No. 2, 1983, pp. 192–199.
Kondo et al, "Electrical Properties of Semiconductor Photodiodes with Semitransparent Films", Japanese J. of Appl. Phys., vol. 10, No. 11, 11/1971, pp. 1547–1554.
Ames et al, "Field Effect Transistors Utilizing Schottky Barrier Principles", IBM Tech. Disclosure Bulletin, vol. 9, No. 10, 3/1967, pp. 1470–1471.
Togashi et al, "An LC-TV Display Controlled by a Si Diode Ring", Proceedings of the SID, vol. 26, No. 1, 1985, pp. 9–15.
Japan Display 1983, N. Szijdlo et al.: "Integrated Matrix Addressed LCD Using . . . ", pp. 416–418.
Patents Abstracts of Japan, vol. 7, No. 238, p. 231 (1383), Oct. 22, 1983, and JP,A, 58126518 (EPUSON K.K)–Jul. 28, 1983.

Primary Examiner—Stanley D. Miller
Assistant Examiner—Huy Kim Mai
Attorney, Agent, or Firm—Oblon, Fisher, Spivak, McClelland & Maier

[57] ABSTRACT

A process for the production of a diode array and liquid crystal display screen. Each display point of the array has a projection connected to an addressing column by a bridge with two diodes connected head to head. The process only involves two photogravure operations. In a second embodiment, a second bridge is connected to an adjacent column by way of the a second projection.

8 Claims, 3 Drawing Sheets

PROCESS FOR THE PRODUCTION OF A DIODE ARRAY AND LIQUID CRYSTAL DISPLAY SCREEN

BACKGROUND OF THE INVENTION

The present invention relates to a process for the production of a diode array and liquid crystal display screen.

The attached FIG. 1 shows a known display screen constituted by an upper plate 10 covered by transparent conductive strips 12 oriented in accordance with parallel rows and a lower plate 20 covered with a block matrix 22 and transparent conductive strips 24 oriented along parallel columns. These two plates are assembled and kept spaced by a shim and a liquid crystal is introduced into the space separating them. Each block constitutes an elementary display zone or "points". A block is electrically connected to the adjacent column by a bridge 26. The exciting of a bridge Pij of the matrix is obtained by applying appropriate voltages to row Li of the upper plate and to column Cj of the lower plate.

There are several known embodiments of bridges 26. Certain of them use transistors (and in particular thin film transistors), whereas others use non-linear elements such as diodes, which makes it possible to increase the number of addressable rows and columns, i.e. the number of display points.

The present invetion relates to a process for producing such a screen and more particularly relaes to the production of bridges 26 in the variant using diodes.

The prior art essentially discloses three different diode bridge types:

1. In the article entitled "Integrated Matrix Address LCD Amorphous Silicon Back to Back Diodes" published by N. Szydlo et al in "Japan Display", 1983, pp. 416–418, a bridge is described, which comprises two back to back diodes. The bridge is formed by a n+ -doped a-Si:H layer, a non-doped or slightly doped a-Si:H layer, an inslutating layer with two openings and two metal (platinum) pads traversing the openings and forming Schottky contacts with the a-Si:H layer.

2. In the article entitled "A 210×228 Matrix LCD Controlled by Double Stage Diode Rings" published by Sergo Togashi et al in the journal . . . pp. 141–144 is described a bridge having two parallel diodes forming a ring. Each diode is of the PIN type and comprises an indium and tin oxide layer (ITO), a chromium layer, a p-doped a-Si, an intrinsic a:Si and a n-doped a:Si stack, a chromium layer, a $SiO_2$ layer having an opening and an aluminium layer covering the complete assembly and in contact with the upper chromium layer.

3. In the article entitled "A 250×240 Element LCD Addressed by Lateral MIM" published by S. Morozumi et al in "Japan Display" 1983, pp. 404–407, a description is given of a bridge comprising a tantalum layer, a thin tantalum pentoxide deposit, a polyimide layer and a chromium layer (MIM or metal-insulator-metal structure).

Although satisfactory in certain respects, the above procedures lead to complex production processes. In particular the first two require four different photolithiography operations, i.e. four masks, with the inevitable alignment problems caused thereby. The third procedure only requires three photogravure operations, but requires a difficultly reproducible thin insulating film.

SUMMARY OF THE INVENTION

The present invention aims at a process obviating these disadvantages. As a result of the invention it is possible in two photolithiography operations only to form a diode bridge between each block and the adjacent column. The bridge obtained is formed from two diodes arranged in head to head manner.

The present invention makes use of rectangular blocks having one or two projections similar to those described in FR-A-No. 2533072. However, in the latter, the conductor bridge connecting each block to the adjacent column is a thin film transistor (TFT), which obviously involves different operations and layers.

More specifically, the present invention relates to a process for the production of a diode array and liquid crystal display screen according to which, for producing the lower plate, on a substrate is deposited a transparent conductive material layer, followed by a first conductive material layer and a first photogravure operation is performed with respect to these two layers for forming a matrix of blocks provided with at least one projection and control columns; the following operations being performed for producing a diode bridge between each block and the adjacent column:

an intrinsic hydrogenated amorphous silicon layer is deposited on the lower plate assembly, a second conductive material is deposited, the first and second conductive materials being chosen in such a way that the stack or pile constituted by these two materials and the interposed aSi:H(i) layer has a diode-type structure, a second photogravure operaton is performed for freeing each block, but so as to leave behind each projection and the adjacent column a bridge formed by the stack or pile of the layer of the first conductive material, the aSi:H(i) layer and the layer of the second conductive material, said bridge being electrically equivalent to two diodes connected in head to head manner.

According to an advantageous variant, the first conductive material is of n+-doped amorphous silicon and the second conductive material is a metal, the latter forming a Schottky contact with the aSi:H(i) which it covers, the two diodes formed in each bridge then being Schottky diodes.

According to another variant, it is the first conductive material which is a metal forming with the aSi:H(i) covering it a Schottky coontact and the second conductive material is of n+-doped hydrogenated amorphous silicon, the two diodes formed in each bridge still being of the Schottky type.

According to another variant, the first conductive material is of p+ or N+-doped aSi:H and the second conductive material is of n+ or p+-doped aSi:H, the two diodes formed in each bridge then being of the p+in+ type.

Other arrangements can be provided for giving a redundancy to the addressing system.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
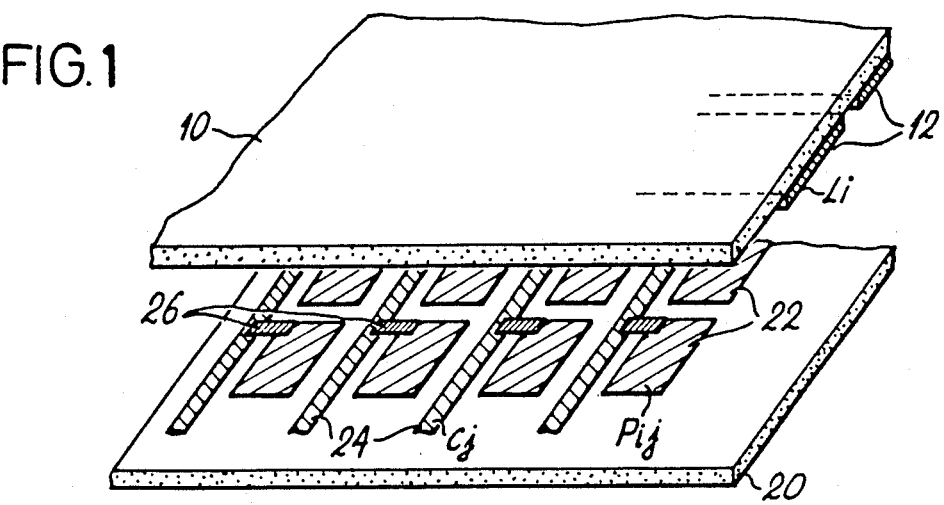
FIG. 1 Already desicrbed, an exploded view of liquid crystal flat display screen.
Figure 2A:
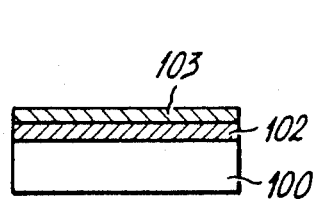
FIG. 2 Various stages (a, b, c, d) of the process according to the invention.
Figure 2B:
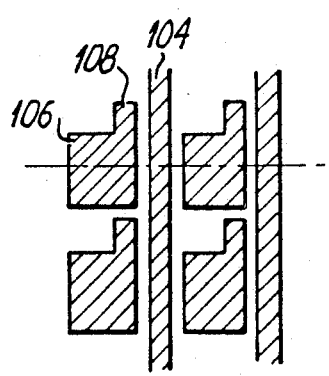
Figure 2C:
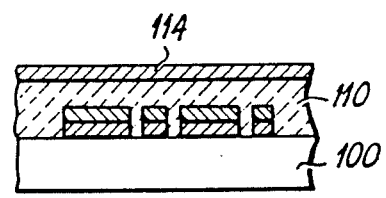
Figure 2D:
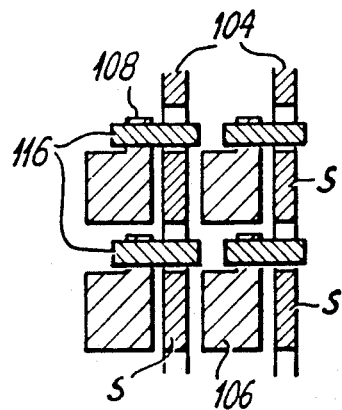

In the following description, the upper plate of the screen, as illustrated by reference numeral 10 in FIG. 1, is ignored because it is obtained by conventional manes (deposition of a ITO layer, followed by etching). Thus, hereinafter, the description will be limited to the means for obtaining the lower plate 20 and the layers covering the same.

FIG. 2 shows four stages in producing the lower plate, the operations being as follows:

On a glass substrate 100 is deposited a transparent conductive material layer 102, e.g. of indium and tin oxide.

This is followed by the deposition thereon of a layer 103 of a first conductive material, e.g. highly n-doped amorphous silicon (part a).

This is followed by a first photogravure of these two layers to form a matrix of blocks 106 arranged in rows and columns, each block being connected to a projection 108. Following the first photogravure operation, there are columns 104 of transparent conductive material 102 surmounted by the highly n-doped amorphous silicon layer 103, said columns being inserted between the blocks (part b).

This is followed by the deposition thereon of a hydrogenated amorphous silicon layer 110.

A layer 114 of a second conductive material, e.g. platinum or chromium is then deposited (part c).

This is followed by a second photogravure applied to layers 103, 110, 114 for feeing each block 106, but leaving behind bridges 116 and optionally segments S on the columns, on part of the gap separating consecutive bridges (part d).

A $SiO_2$ layer for passivating the assembly is then deposited (not shown).

Layers 103-110-114 are chosen in such a way that a diode-type structure is formed. For example the second conductive material 114 can be constituted by platinum or chromium, which with the aSi:H layer 110 forms a Schottky contact. However, other combinations are possible, as can best be seen with respect to FIGS. 8a, b and c.

Figure 3:
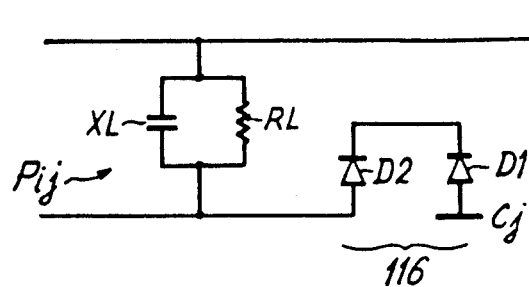
FIG. 3 An equivalent circuit diagram showing the connection between each display point and the corresponding row-column pair.

No matter what the embodiment used, a first diode is obtained facing each projection 108 and a second diode facing each column, said two diodes being positioned in a similar manner. The equivalent circuit diagram of a display point Pij as shown in FIG. 3. This point is equivalent to a capacitor, whose coatings or foils are constituted by the block of the lower plate and that part of the row facing said block on the upper plae, said capacitor having a capacitance XL, with a parallel resistance of value RL. This dipole RC is on the one hand connected to row Li and on the other hand, across bridge 116, to column Cj, said bridge having two diodes D1, D2 connected head to head.

Figure 4:
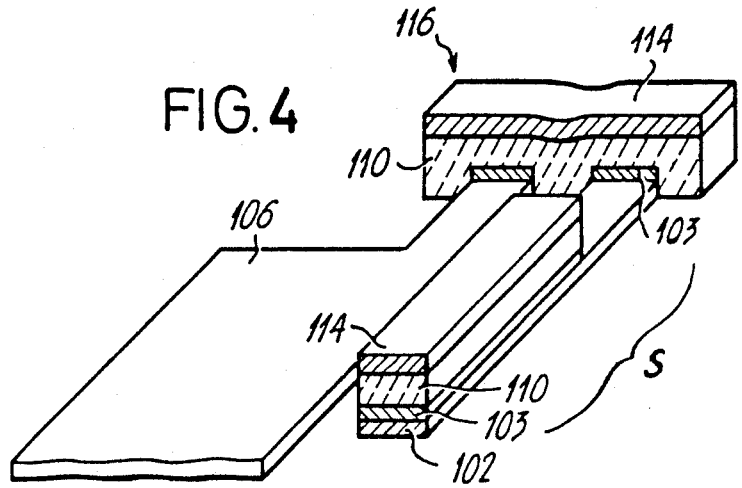
FIG. 4 A detail of the segment which can be left on the columns following the second photogravure operation.

FIG. 4 shows in perspective the layers obtained at a bridge 116 and a segment S. It is possible to see the stack or pile 103-110-114 forming the head to head diode bridge between a column and the adjacent block and a segment S partly covering a column.

Figure 5:
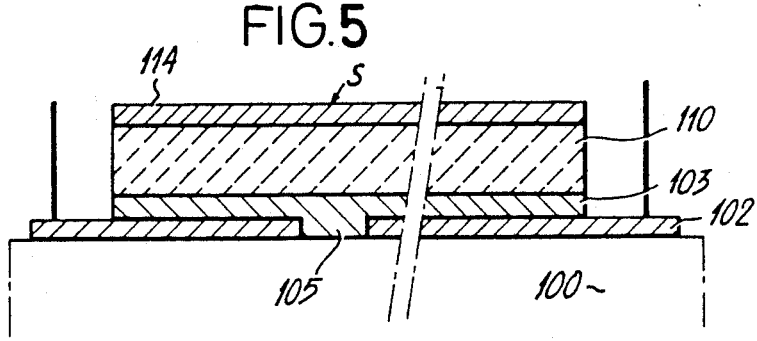
FIG. 5 Such a segment in section.

FIG. 5 gives a better understanding as to how the stack left on the column can, in the case of the column breaking, function as a conductor bridge between the two parts of the column. It is possible to see a column with a break 105. The conductor bridge formed by segment S and particularly conductive layer 103 reestablishes the electrical continuity.

This has the further advantage that stack S hides the column from the viewer. If said column is not hidden, it is visible in the same way as a display point. Its appearance is dependent on the mean value of the video voltage during an image. This is very disturbing in the display mode of white on a black background, because the eye is very sensitive even to very thin white lines. In the other mode, black on a white background, the effect is much less visible, a black line with a width of 20 $\mu$m on a white background being invisible to the eye. The hiding of the transparent columns is consequently necessary particularly in the first mode and is perfectly obtained by this variant of the invention.

It should be noted that the realization of this segment causes no special operation, because it is simply the design of the second masking level which has to be provided as a consequence thereof.

In the preceding description, each block 106 is associated with a projection 108 by means of which the electrical connection takes place with the preceding column. In another embodiment, each block comprises a second projection 108*, which is diagonally opposite the first and permits an electrical connection with the following column. Each block is then connected by two head to head diode bridges to the addressing columns.

The interest of this arrangement is that if one of the addressing columns is broken, the point can still be excited by the other column. For a point to be inaccessible, it would be necessary for the two surrounding columns to be simultaneously broken or interrupted, which is statistically highly unlikely.

This arrangement in no way complicates the process for the production of the display screen. During the first photogravure operation, it is merely necessary to provide for the formation of a second projection and, during the second photogravure operation, the formation of a longer diode bridge.

Figure 6:
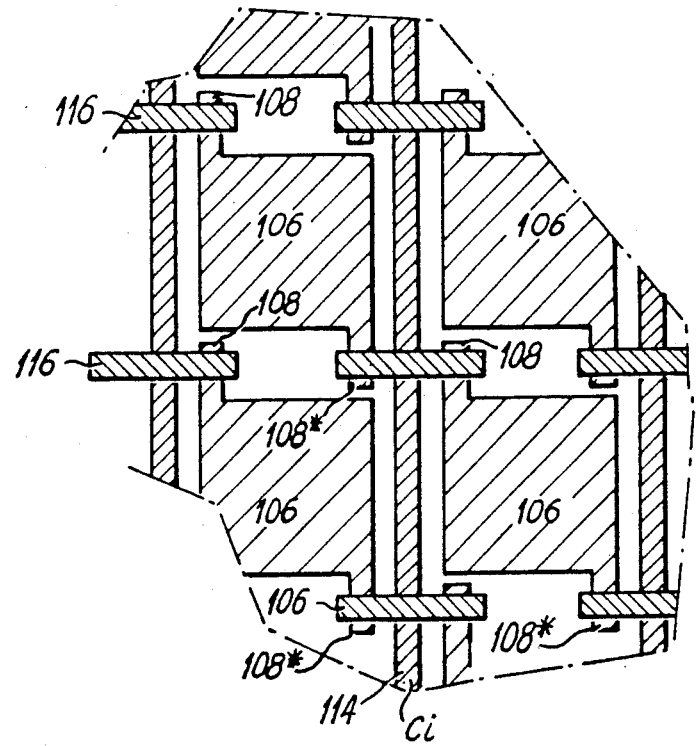
FIG. 6 A variant with two bridges for each display point, which gives a redundancy on addressing.

FIG. 6 illustrates this arrangement. Each block 106 comprises a first projection 108 in the upper left-hand corner and a second portion 108* in the lower right-hand corner. Each bridge 116 connects a column of rank j to the projection 108 of the block corresponding to row i and located to the right of column j and to projection 108* of the block corresponding to row i−1 positioned to the left of column j.

Figure 7:
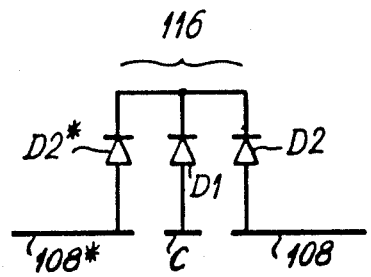
FIG. 7 The electric circuit diagram corresponding to said variant.

FIG. 7 shows the equivalent circuit diagram of such a bridge, diode D1 at column C and diodes D2, D2* at projections 108, 108*.

Naturally, the presence of the second diode bridge D1-D2* slightly modifies the addressing process for each point, in the sense that the excited point Pij, instead of storing the excitation corresponding to row Li and column Cj, will store the final excitation received, in the present case the second excitation (if there is no interruption or break), which corresponds to row Li+1 and column Cj+1. However, in most cases, this modification lacks any significance, because it merely amounts to displacing the displayed image by a row interval and a column interval.

Figure 8A:
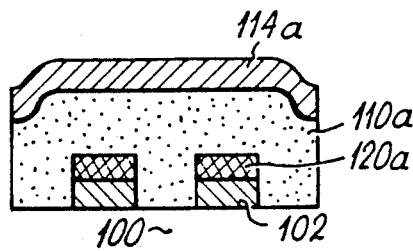
FIGS. 8a, 8b, 8c In sectional form, three variants of the diodes (Schottky and PIN).
Figure 8B:
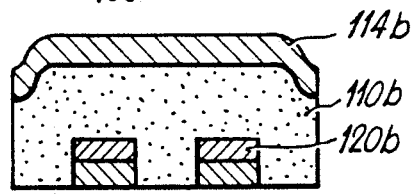
Figure 8C:
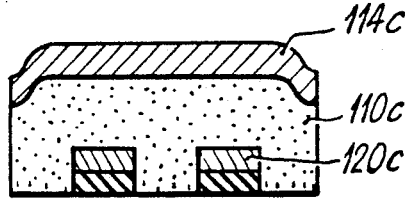

FIGS. 2, 4 and 5 correspond to a case where the first conductive material 103 is of n+-doped aSi:H and the second conductive material 114 is a metal (Pt or Cr). However, this is not the only possible arrangement. FIGS. 8a to 8c illustrate three other embodiments of the diode bridge.

In FIG. 8a, layer 120a is of metal (Pt, Cr), layer 110a of intrinsic aSi:H and layer 114a of n+-doped aSi:H, the diodes formed then being of the Schottky type.

In FIG. 8b, layer 120b is of p+-doped aSi:H, the aSi:H(i) layer 110b and layer 114b of n+-doped aSi:H, the diodes formed then being of the p+-i-n+ type.

In FIG. 8c, layer 120c is of n+-doped aSi:H, layer 110c of aSi:H(i) and layer 114c of p+-doped aSi:H, the diodes still being of the p+-i-n+ type.

Layer 102 is of ITO in all three cases.

What is claimed is:

1. A process for the production of the diode array and liquid crystal display screen in which:
    an upper plate is produced by depositing on a first substrate transparent conductive control rows,
    a lower plate is produced by depositing on a second substrate a transparent conductive material layer, followed by a first conductive material layer and carrying out a first photogravure process on these two layers for forming a matrix of electrode segments, said matrix being constituted by rows of electrode segments and columns of electrode segments, each electrode segment having at least one projection, each electrode segment constituting an elementary display point, as well as for forming control columns placed between the column of electrode segments,
    each electrode segment is connected to an adjacent control column by a bridge having two diodes,
    the two plates obtained are assembled with a liquid crystal material therebetween in such a way that the control rows covering the first substrate of the upper plate cover the rows of electrode segments of the matrix, said control rows covering the first substrate of said upper plate being perpendicular to the columns of the lower plate,
    wherein, for producing a bridge between each electrode segment and the adjacent control column, the following operations are performed:
    an intrinsic hydrogenated amorphous silicon layer aSi:H(i) is deposited on the lower plate following the first photogravure operation,
    a second conductive material is deposited, the first and second conductive materials being chosen in such a way that the stack constituted by these two materials and the interposed aSi:H(i) layer has a diode-type structure,
    a second photogravure operation is performed for freeing each electrode segment, but leaving between each projection and the adjacent column a bridge formed by the stack of the layer of the first conductive material, the aSi:H(i) layer and the layer of the second conductive material, said bridge being electrically equivalent to two diodes connected in head to head manner.

2. A process according to claim 1, wherein the first conductive material is of n+-doped amorphous silicon and the second conductive material is a metal, the latter forming a Schottky contact with the aSi:H(i) which it covers, the two diodes formed in each bridge then being Schottky diodes.

3. A process according to claim 1, wherein the first conductive material is a metal forming with the aSi:H(i) which it covers a Schottky contact and wherein the second conductive material is n+-doped hydrogenated amorphous silicon, the two diodes formed in each bridge being of the Schottky type.

4. A process according to either of the claims 2 and 3, wherein the metal is of platinum or chromium.

5. A process according to claim 1, wherein the first conductive material is of p+-doped aSi:H and the second conductive material is of n+-doped aSi:H, the two diodes formed in each bridge being of type p+-i-n+.

6. A process according to claim 1, wherein the first conductive material is n+-doped aSi:H and the second conductive material is of p+-doped aSi:H, the two diodes formed in each bridge being of the p+-i-n+ type.

7. A process according to claim 1, wherein during the second photogravure operation for the stack, apart from the bridges, segments of the stack are left behind along the columns over part of the gaps separating two consecutive bridges.

8. A process according to claim 1, wherein each block comprises two diagonally opposite projections disposed on either side of the block and along two adjacent columns and wherein, during the second photogravure operation, bridges connecting each column to the two surrounding projections are left behind.

* * * * *